INVENTOR.
WILLIAM L. KOMPH, SR.

INVENTOR.
WILLIAM L. KOMPH, SR.
BY
His Attorney

United States Patent Office 2,818,492
Patented Dec. 31, 1957

2,818,492

PNEUMATICALLY OPERATED WELDER HEAD CONSTRUCTION

William L. Komph, Sr., Port Huron, Mich., assignor to The Wellman Engineering Company, Cleveland, Ohio, a corporation of Ohio Application April 17, 1957, Serial No. 653,463

8 Claims. (Cl. 219—89)

This invention relates to a pressure-fluid operated welder head, commonly referred to as a welding gun, adapted to support, reciprocate, and exert a holding pressure on the welding electrode or tip carried thereby.

The general object of the invention is to provide such a welder head so constructed that it is simple, durable, compact, convenient to operate, and which assures accurate positioning of the electrode in contact with the part to be welded.

A more specific object is to so arrange the parts of such a device that it may be relatively short, while providing a sufficient length of guiding means for the reciprocating piston element and electrode carrier, and which also affords effective protection of the working parts from weld spatter.

Another object is to provide an effective, durable, cheaply manufactured and easily assembled arrangement for preventing the relative rotation of the reciprocating element within its cylinder, to thus assure the precise and uniform angular positioning of the offset tip of the electrode.

It is recognized that prior welding guns of this general nature have included means for preventing the angular rotation of the piston and electrode carrier with relation to the cylinder and casing and its support. However, in carrying out the present invention, a novel form of relatively telescoping elements includes a fixed post extending into the piston element with a non-rotatable but sliding engagement. This results in a relatively short gun or welder head. Within limits of the practical requirements, my novel, non-rotating means permits the provision of a guide for the reciprocating member of substantially greater length, in relation to the overall length of the gun, thus assuring continuous alignment and desired resistance to the tendency to wear toward misalignment or eccentric looseness, which tends to occur by reason of the repeated pressure upon the axially offset tip of the electrode.

The simplicity of the device permits the working part to be self-contained, and the passages for the actuating pneumatic pressure may be conveniently located and economically formed in the assembly.

Prior structures in which a reciprocating piston or like element in a cylinder is prevented from rotation by a stationary projection extending into and slidably engaging complementary angular or key-receiving surfaces in the reciprocating element are recognized to have been used in other forms of tools. However, the present invention includes a particularly novel, convenient and economical construction of a non-rotating slidable connection, particularly adapted to a welding gun.

Other objects and advantages of the present construction will appear in the following description, which relates to the accompanying drawings showing a preferred form of my invention, and also showing an illustrative modification using a relatively short guide sleeve for the reciprocating element.

Figures 1, 2:
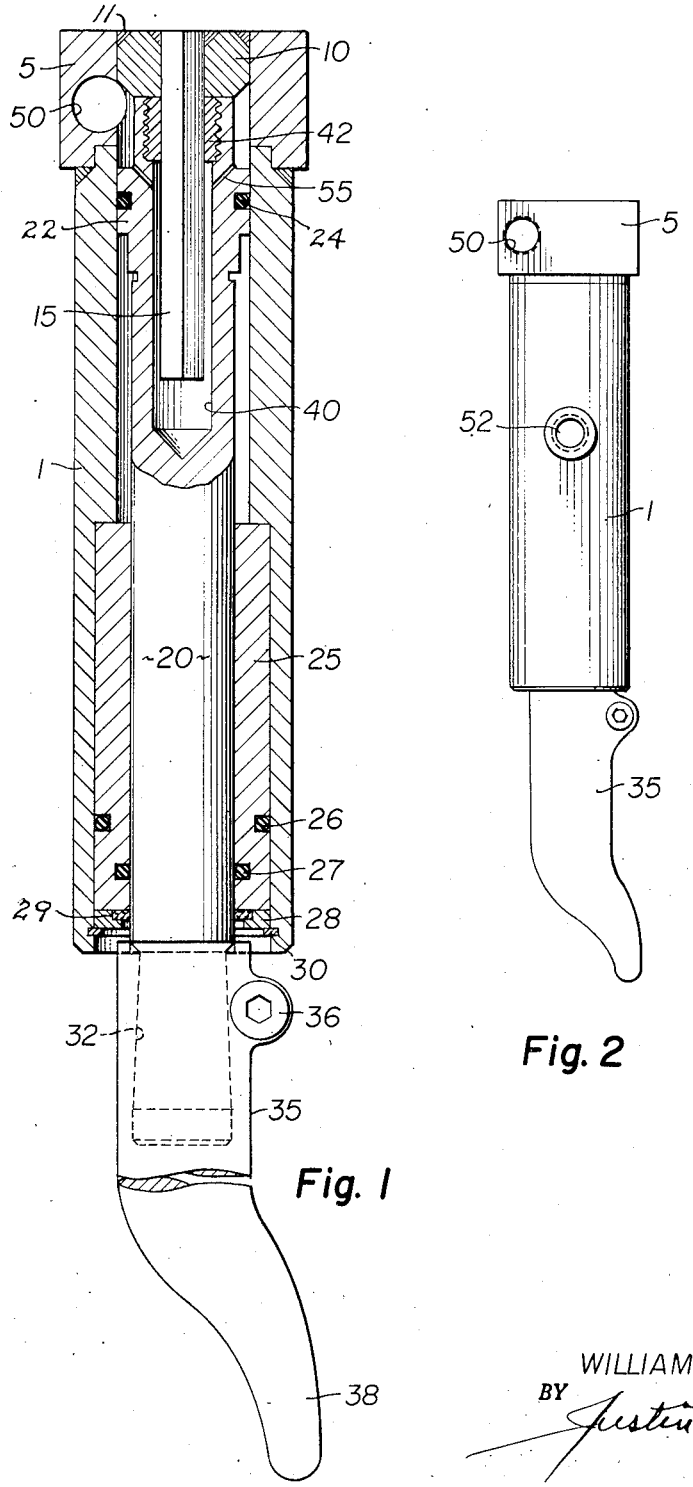
Fig. 1 is a longitudinal axial section through the welder head assembly, illustrating the electrode with the offset tip and the means for preventing rotation of the reciprocating carrier therefor.
Fig. 2 is a side elevation, on a reduced scale, of such an assembled welder head looking toward the outside of the gun in the same direction as that illustrated in the sectional view of Fig. 1, and with the electrode in position.

Referring to the drawing, the welding gun comprises a cylinder 1 closed at one end by a head construction which includes a laterally extending support 5, shown as fitted to the cylinder by an offset joint-flange 2 and indicated as welded at 3 thereto. This member 5 has a bore 7 concentric with and continuing the cylindrical inner surface 4 of the cylinder 1, and having a closure plug 10 fitted therein and welded as indicated at 11. The cylinder head rigidly carries an axially positioned hexagonal post 15 extending into the cylinder, as shown, and acting to prevent the rotation of the reciprocating member 20, which constitutes the piston and electrode carrier, and which has a cylindrical portion with an enlargement forming the piston proper, as indicated at 22, and shown as having a groove for an O-ring seal 24.

The cylindrical portion of the piston extends outwardly through a guide sleeve 25, closely fitted into an enlarged cylindrical interior surface in the cylinder body 1, and, in turn, provided with suitable resilient ring seals 26 and 27. The inner end of the sleeve 25 is seated against a shoulder, as shown, while at its outer end is a securing ring 28 and protective sealing packing ring 29, and these in turn are held in position by a snap ring washer 30.

Figure 4:
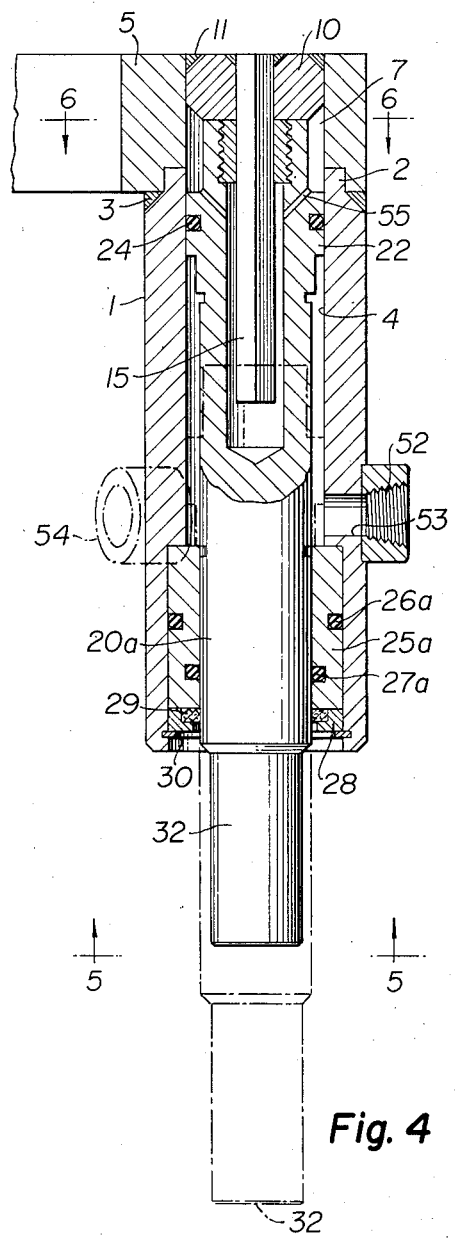
Fig. 4 is an axial section illustrating the shorter gun construction and showing in broken lines the outward position of the electrode carrier.
Figure 3:
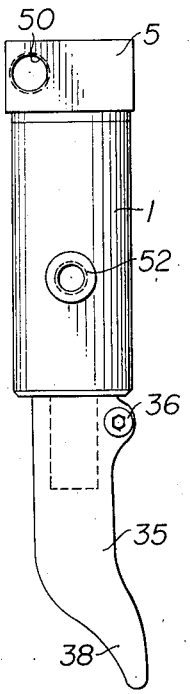
Fig. 3 is an elevation similar to Fig. 2 showing a shorter gun construction.

The outer end of the piston rod member is provided with an extension 32 shaped to receive and carry the welding electrode 35 shown as embracing the same, and of a type to be clamped in position as by a clamping screw 36. The welding tip proper 38, as appears in Figs. 2 and 4, is substantially offset from the axis of the piston and cylinder, tending to exert a lateral pressure on the guide sleeve, wherefor there is considerable advantage in assured alignment and prolonged wear in having this sleeve 25 several times longer than the diameter of the member 20 without requiring excessive length of the assembly.

It will be seen that if, as has been a practice heretofore, two connected piston heads are used, with a non-rotating guide formed on a portion of such a reciprocating member, difficulty is encountered in constructing the assembly within the desired longitudinal overall length.

More specifically, even with the use of one head, if the device includes a keyed or flattened surface portion on the reciprocating member coacting with a non-rotating surface or guide, in addition to the cylindrical sealing guide, such as the sleeve 25, the resulting length is apt to be objectionable, and the use of the welding head with present standard equipment is restricted.

Accordingly, an important feature of the present construction is the arrangement for preventing the turning of the reciprocating member by the telescoping post 15, extending into an axial bore 40 in the inner end of the reciprocating piston member.

In the arrangement shown, the rigid post 15 is hexagonal. Although any suitable non-circular or angular shape may be used, a practical advantage is gained by the use of this hexagon rod-like post, in that the head member 10 may have a hexagon opening broached therein, or a simple round bore may receive the end of the hexagon section, and the mounting opening for the post may be closed by welding, which at the same time would firmly anchor it in position.

Hexagon bushings are commercially available in standard sizes in the form of hollow set screws which may be selected to slidably fit a given size of rod. Such a hollow set screw member is indicated at 42, threaded into the slightly enlarged upper end of the bore 40 in the piston member 20. This set screw like bushing may be brazed or firmly welded to the piston element for securely holding it against rotation, and as it slides on the rod with the reciprocation of the piston member, it prevents rotation of, and uniformly angularly locates, the tip 38 of the electrode.

It will be seen that the parts so far described may be most conveniently assembled. The cylinder having been prepared with its bore and two diameters, and the head 5 having been fitted thereon with the closure 10 and post 15 in position, the piston may be inserted. The sleeve 25 may be then slid over the end of the piston and into position in the cylinder body 1. The securing ring 28 and its packing may be set into position and secured by the snap washer 30.

The tubular connections for the actuating fluid pressure may then be connected and the operation for reciprocation may be effected by controlling the entrance and exhaust of fluid to and from the cylinder and piston.

Figure 5:
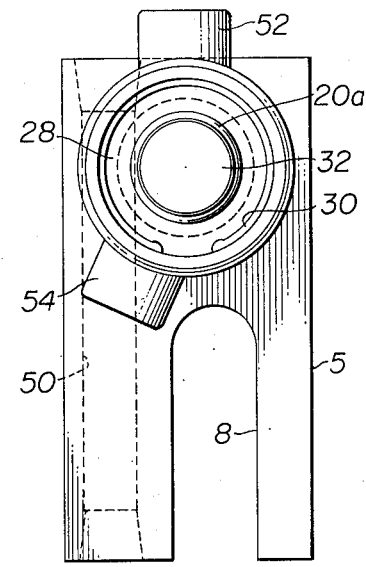
Fig. 5 is an end elevation of the welder head assembly looking toward the same from a plane indicated by the lines 5—5 of Fig. 4.
Figure 6:
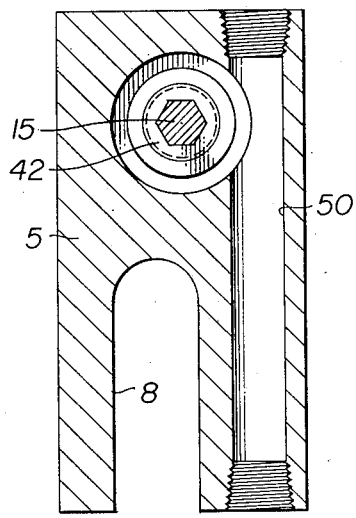
Fig. 6 is a transverse section, the plane of which is indicated by the line 6—6 of Fig. 4.

The head member 5 is shown as extending laterally at one side of the upper end of the cylinder body 1 and as provided with a slot 8 for receiving a clamping or securing bolt or bolts holding the welding head in its operating position. One portion of this lateral extension is enlarged to receive a drilled bore forming a passage 50, preferably threaded at its ends to receive tubular connections for bringing the fluid under pressure to the bore 4 above the enlarged piston head portion 22, as appears in Fig. 6, the fluid entering at one end of the passage 50 and passing out at the other as the piston is reciprocated. A threaded boss 52 and a port 53 may lead pressure to the cylinder bore below or at the other side of the piston head for returning the piston. This action may be valve controlled for exhaust at another port formed in a boss appearing in Fig. 5 at 54, and in broken lines in Fig. 4 may provide an alternative exhaust passage.

As the piston reciprocates, fluid is permitted to pass into and out of the bore 40 by vents shown at 55.

Referring particularly to Fig. 4, it will be noted that the cylinder is shorter than in the form shown in Fig. 1, and, for convenience, the corresponding parts are numbered the same in the description of this view, except that to call particular attention to the shorter guide sleeve, it is here designated 25a. It corresponds to the longer sleeve 25, and is provided as before with the sealing rings 26a and 27a, and is held in position by a locking ring and spring washer of the same construction as shown in Fig. 1.

It will be apparent that when so assembled and mounted by suitable clamping means as indicated, the piston, while being permitted to reciprocate, is prevented from angular rotative movement and that the positioning of the electrode tip with relation to the mounting of the welder head may be accurately adjusted and securely held in its desired angular relation by the clamping screw 36.

In operation the piston reciprocates from the position shown in solid lines to that indicated by the broken lines, showing particularly the position of the outer end in Fig. 4. When in the outer position, the electrode with its welding tip is pressed against the surface of the part to be welded for the desired period of time.

As appears from the foregoing, to effect the outward movement and welding pressure, the fluid above the piston head 22 is admitted through the passage 50, and at the finish of each weld, under the control of the usual valve arrangements, the fluid is released and exhausted from the upper end of the cylinder, while fluid is admitted at the lower end, as through the passage or port 53, moving the piston inwardly upwardly to the position shown in solid lines in Figs. 1 and 4. Obviously, this operation may be repeated by valve controls.

Large numbers of such welding heads are used in extended and continuous operations. Their durability is important, and, as indicated, the length is restricted. Obviously by the present invention an effective saving of length is attained by reason of the telescoping, non-rotating guiding arrangement described.

In the form shown in Fig. 1, advantage is taken of this where the use permits of a given length of the welder head to provide a guide sleeve for the reciprocating piston rod 20, which may be several times the diameter of the piston rod, and whereby lateral strain and resulting wear due to the offset electrode tip is overcome and minimized to a large degree.

According to the same mechanical considerations, however, even shorter welding head construction may be made and successfully used with a relatively shorter guide sleeve or bushing 25a, which, however, is still of considerable length and will withstand the strains and is capable of protracted wear. These guide sleeves 25 or 25a may be readily replaced when necessary by reason of the manner in which they are secured in position.

Having thus described my invention, what I claim is:

1. A welding device comprising a cylinder, a piston member slidably mounted in said cylinder, an electrode carried by the piston and having a welding tip offset from the axis of the piston and cylinder, mounting means fixed to the cylinder, a closure forming a cylinder head, a post rigid with the head extending into the cylinder and having a plurality of parallel guide surfaces thereon, said piston comprising a cylinder engaging portion and a reduced rod portion adapted to extend outwardly from the cylinder and having an electrode carrying surface, means for holding an electrode on said latter outwardly extending surface and for positioning the electrode with its offset tip in different angular positions with relation to the cylinder mounting means, the piston and rod having an axial bore extending thereinto to receive said post, a bushing rigidly carried by the piston and fitting and slidably engaging said guide surfaces on the post, a guide sleeve fitting said reduced rod portion of the piston member and fitted into the cylinder, and clamping means for holding the guide sleeve in the cylinder including a protective packing.

2. The welding device described in claim 1 in which the piston member comprises a rigid element with an enlargement adjacent the cylinder head and carrying a packing ring, and in which the guide sleeve engaging the reduced piston rod portion is provided with packing rings and is of a length substantially greater than the diameter of the piston.

3. The device described in claim 1 in which the piston rod is cylindrical and of a diameter slightly less than the piston head, and in which the guiding sleeve embraces the piston rod for a distance several times the diameter of the piston rod.

4. A welding device comprising a cylinder and reciprocating piston element having an elongated cylindrical rod portion and an enlarged head portion, means closing one end of the cylinder while the rod portion may reciprocate inwardly and extend outwardly from the other end, the piston having a bore extending inwardly from the end thereof adjacent the cylinder head portion, a rigid post extending into the cylinder and into the bore of the piston element, a bushing carried by the piston fitting and slidably and non-rotatably embracing said post, an electrode having a laterally offset welding tip, means for securing the electrode to the piston element in predetermined angular position with relation to the cylinder, and means for fixedly mounting the cylinder, said cylinder having passages for pressure fluid for actuating the piston to reciprocate it and hold the electrode tip in pressure contact engagement with a workpiece.

5. The device defined in claim 4 in which the slidable bushing rigid with the piston and embracing said post and said post have complementary hexagonal surfaces.

6. A pressure fluid actuated welding device comprising a cylinder, means closing one end thereof, means for rigidly mounting the cylinder in fixed position, a piston element in the cylinder comprising a substantially cylindrical rod portion and an enlargement forming the piston proper and having a packing ring fitting inside the cylinder, and said piston element being of a length such as to extend outwardly from the cylinder and having an electrode carrying portion normally projecting beyond the cylinder, a welding electrode and means for clamping it on said projecting portion in different angular positions with relation to the cylinder mounting, the cylinder having an enlarged bore at the end of the cylinder adjacent the electrode, a guide sleeve fitted into said enlarged bore, a packing and locking means engaging the end of said sleeve and embracing the piston rod portion, said sleeve being of a length substantially greater than the diameter of the piston, a closure forming a cylinder head at one end therof, an axially positioned hexagonal rod fixed in the head and projecting into the cylinder, said piston having a bore receiving the same, a bushing threaded into the cylinder head and having a complementary hexagonal opening slidably embracing said rod, the piston element having vent openings from said bore to the space between the cylinder head and piston head.

7. A welding device comprising a cylinder, a piston member slidably mounted in said cylinder, an electrode rigidly carried by the piston member and having a welding tip offset from the axis of the piston and cylinder, a closure forming a cylinder head, a post rigid with the head extending into the cylinder, the piston member having a bore extending thereinto to receive said guide post and having a surface slidably and non-rotatably engaging said guide post, whereby the welding tip may be maintained in a predetermined angular position relative to the cylinder.

8. The device defined in claim 7 in which a vent passage is provided leading from said bore in the piston member to the space between the cylinder head and piston head.

References Cited in the file of this patent
UNITED STATES PATENTS

| | | |
|---|---|---|
| 2,293,338 | Harris | Aug. 18, 1942 |
| 2,675,454 | Warner | Apr. 13, 1954 |
| 2,714,150 | Kaiser | July 26, 1955 |